United States Patent
Park

(10) Patent No.: US 11,904,832 B2
(45) Date of Patent: Feb. 20, 2024

(54) SYSTEM FOR CONTROLLING VEHICLE POWER USING BIG DATA

(71) Applicants: Hyundai Motor Company, Seoul (KR); Kia Motors Corporation, Seoul (KR)

(72) Inventor: Hyun Soo Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 281 days.

(21) Appl. No.: 17/099,260

(22) Filed: Nov. 16, 2020

(65) Prior Publication Data

US 2021/0362702 A1 Nov. 25, 2021

(30) Foreign Application Priority Data

May 19, 2020 (KR) .......................... 10-2020-0059601

(51) Int. Cl.
*B60W 20/10* (2016.01)
*B60W 10/26* (2006.01)
*B60L 58/12* (2019.01)

(52) U.S. Cl.
CPC ............. *B60W 20/10* (2013.01); *B60L 58/12* (2019.02); *B60W 10/26* (2013.01); *B60W 2510/244* (2013.01); *B60W 2510/246* (2013.01); *B60W 2556/05* (2020.02); *B60W 2556/45* (2020.02)

(58) Field of Classification Search
None
See application file for complete search history.

(56) References Cited

U.S. PATENT DOCUMENTS

| 5,487,002 A * | 1/1996 | Diller ..................... B60L 1/003 701/1 |
| 10,031,188 B2 | 7/2018 | Lee et al. |
| 11,445,362 B2 | 9/2022 | Liu et al. |

(Continued)

FOREIGN PATENT DOCUMENTS

| CN | 112349975 A | 2/2021 |
| EP | 1 604 341 B1 | 12/2005 |

(Continued)

OTHER PUBLICATIONS

Office Action dated Sep. 21, 2022 in U.S. Appl. No. 17/099,148.

(Continued)

*Primary Examiner* — Todd Melton
*Assistant Examiner* — Jason R Roberson
(74) *Attorney, Agent, or Firm* — Fox Rothschild LLP

(57) ABSTRACT

A system for controlling vehicle power using big data is provided. The system includes a big data server that receives vehicle driving related data, processes and analyzes the received data to generate a driving power pattern of the vehicle, and stores the driving power pattern. A vehicle controller determines whether to limit charging/discharging power of a battery based on continuous charging/discharging time or an accumulation amount of continuous charging/discharging power of the battery and calculates battery charging/discharging power to be limited based on the driving power pattern received from the big data server when the charging/discharging power of the battery is limited.

8 Claims, 3 Drawing Sheets

(56) References Cited

U.S. PATENT DOCUMENTS

| | | | |
|---|---|---|---|
| 2005/0274553 A1* | 12/2005 | Salman | B60L 15/2045 180/65.28 |
| 2013/0030630 A1* | 1/2013 | Luke | G06Q 30/0259 701/22 |
| 2013/0073507 A1* | 3/2013 | Sera | B60L 3/12 706/46 |
| 2014/0236403 A1* | 8/2014 | Liu | B60L 3/12 701/123 |
| 2015/0120225 A1 | 4/2015 | Kim | |
| 2016/0202323 A1 | 7/2016 | Lee et al. | |
| 2016/0297416 A1 | 10/2016 | Geller | |
| 2017/0067750 A1 | 3/2017 | Day et al. | |
| 2018/0056807 A1 | 3/2018 | Park et al. | |
| 2018/0123185 A1 | 5/2018 | Kim et al. | |
| 2018/0257473 A1 | 9/2018 | Follen et al. | |
| 2018/0329935 A1 | 11/2018 | Mugali et al. | |
| 2019/0132709 A1 | 5/2019 | Graefe et al. | |
| 2020/0013244 A1 | 1/2020 | Rosenbaum | |
| 2020/0070679 A1 | 3/2020 | Wang et al. | |
| 2020/0077240 A1 | 3/2020 | Bansal et al. | |
| 2020/0092396 A1 | 3/2020 | Wu et al. | |
| 2020/0127980 A1 | 4/2020 | Smith et al. | |
| 2020/0137351 A1 | 4/2020 | Bai et al. | |
| 2020/0307621 A1 | 10/2020 | Ostrowski et al. | |
| 2021/0094435 A1 | 4/2021 | Rechkemmer et al. | |
| 2021/0175732 A1 | 6/2021 | Matsuda et al. | |
| 2022/0026492 A1 | 1/2022 | Verheijen et al. | |
| 2022/0109726 A1 | 4/2022 | Katata et al. | |
| 2022/0266719 A1 | 8/2022 | Iida et al. | |
| 2022/0281345 A1 | 9/2022 | Kim et al. | |
| 2023/0105038 A1 | 4/2023 | Liu et al. | |

FOREIGN PATENT DOCUMENTS

| | | |
|---|---|---|
| KR | 2015-0042566 A | 4/2015 |
| KR | 20180116914 A | 10/2018 |
| KR | 20190100114 A | 8/2019 |
| KR | 2019-0122298 A | 10/2019 |
| KR | 20200040576 A | 4/2020 |
| WO | 2019196094 A1 | 10/2019 |

OTHER PUBLICATIONS

M.A. Salahuddin et al., "Software-Defined Networking for RSU Clouds in Support of the Internet of Vehicles", IEEE Internet of Things Journal, 2(2), Apr. 2015.

M. Shengdong et al., "Intelligent Traffic Control System Based on Cloud Computing and Big Data Mining", 2019, IEEE Transactions on Industrial Informatics, 15(12) (Year 2019).

W. Menghua, "A Real-Time Android-Based Monitoring System for the Power Lithium-Ion Battery Used on EVs", IEEE, 2017 10th International Conference on Intelligent Computation Technology and Automation (ICICTA), Oct. 9-10, 2017. Abstract Only.

Farmann et al. (Oct. 2016) "A Comprehensive Review of On-board State-of-Available-Power Prediction Techniques for Lithium-ion Batteries in Electric Vehicles", Journal of Power Sources, 329:123-137.

Taylor Christine (Jun. 8, 2017) "Big Data Architecture: Datamation", 9 pages.

Office Action dated Oct. 26, 2022 in U.S. Appl. No. 16/995,516.
Office Action dated Jun. 1, 2023 in U.S. Appl. No. 17/099,148.
Office Action dated Jul. 25, 2023 in U.S. Appl. No. 17/027,055.
Notice of Allowance dated Oct. 12, 2023 in U.S. Appl. No. 17/099,148.

* cited by examiner

SYSTEM FOR CONTROLLING VEHICLE POWER USING BIG DATA

CROSS-REFERENCE TO THE RELATED APPLICATION

This application claims priority from Korean Patent Application No. 10-2020-0059601, filed on May 19, 2020, the disclosure of which is incorporated herein by reference in its entirety.

BACKGROUND

1. Field of the Disclosure

The present disclosure relates to a system for controlling vehicle power using big data, and more specifically, to a system for controlling vehicle power using big data, which construct a power pattern of a vehicle using big data through distributed cloud servers and limit vehicle power using the constructed power pattern during charging/discharging of the vehicle.

2. Description of the Related Art

In general, an available power value during charging/discharging of a high-voltage battery that stores driving power of an eco-friendly vehicle corresponds to a power value that may be continuously charged/discharged for a reference time, and this available power value is predetermined, stored in a battery management system (BMS) in a vehicle in the form of a data map and applied to vehicle power control.

Accordingly, when the high-voltage battery is continuously charged/discharged for a time exceeding the reference time, the stored data map with respect to the available power value is unable to be applied to vehicle power control and thus the high-voltage battery is protected in such a manner that vehicle power is rapidly limited using an actual voltage value of the high-voltage battery. Such a conventional vehicle power control technique has a negative influence on driving stability and dynamic performance of a vehicle due to abrupt change in available power.

It will be understood that the above matters described in the related art are merely for promotion of understanding of the background of the disclosure and should not be recognized as prior art well-known to those skilled in the art.

SUMMARY

Therefore, the present disclosure provides a system for controlling vehicle power using big data, which may prevent abrupt change of available power of a vehicle by constructing a power pattern of the vehicle using big data constructed through distributed cloud servers and limiting vehicle power using the constructed power pattern during charging/discharging of the vehicle.

In accordance with an aspect of the present disclosure, the above and other objects may be accomplished by the provision of a system for controlling vehicle power using big data that may include: a big data server configured to receive vehicle driving related data generated in a vehicle, process and analyze the received data to generate a driving power pattern of the vehicle, and store the driving power pattern; and a controller provided in the vehicle and configured to determine whether to limit charging/discharging power of a battery based on continuous charging/discharging time or an accumulation amount of continuous charging/discharging power of the battery and calculate battery charging/discharging power to be limited based on the driving power pattern received from the big data server when the charging/discharging power of the battery is limited.

In an exemplary embodiment of the present disclosure, the big data server may include a lower layer cloud server configured to directly receive the vehicle driving related data from the vehicle, and a higher layer cloud server configured to receive the vehicle driving related data from the lower layer cloud server, process the vehicle driving related data to generate the driving power pattern and store the driving power pattern. In an exemplary embodiment of the present disclosure, the controller may be configured to calculate the continuous charging/discharging time of the battery when actually measured charging/discharging power of the battery is greater than a preset rate of preset maximum available charging/discharging power.

In addition, the preset maximum available charging/discharging power may be stored in the controller in the form of a data map based on state of charge of the battery and a surrounding temperature. When the continuous charging/discharging time of the battery is greater than a preset reference time, the controller may be configured to calculate the battery charging/discharging power to be limited by reflecting the driving power pattern in the actually measured battery charging/discharging power.

When the continuous charging/discharging time of the battery is greater than the preset reference time, the controller may be configured to calculate the battery charging/discharging power to be limited by calculating a charging/discharging power limiting rate that is a function of the actually measured battery charging/discharging power, the driving power pattern and the continuous charging/discharging time and multiplying the actually measured battery charging/discharging power by the charging/discharging power limiting rate.

In addition, the controller may be configured to compare the accumulation amount of continuous charging/discharging power of the battery with a preset reference accumulation amount, and when the accumulation amount of continuous charging/discharging power is greater than the reference accumulation amount, divide the accumulation amount of continuous charging/discharging power by the preset reference accumulation amount to calculate an accumulation amount excess rate.

In response to determining that the accumulation amount of continuous charging/discharging power is greater than the reference accumulation amount, the controller may be configured to calculate the battery charging/discharging power to be limited by calculating a charging/discharging power limiting rate that is a function of the driving power pattern and the accumulation amount excess rate and multiplying the actually measured battery charging/discharging power by the charging/discharging power limiting rate. The driving power pattern may be a learning value determined according to the driving power pattern in the big data server.

Although a conventional map data based battery power limiting method may cause a situation in which a vehicle is unable travel due to abrupt power limitation according to arrival at an upper or lower limit value of a battery voltage, the above-described system for controlling vehicle power using big data may proactively protect a battery before a situation in which a vehicle is unable travel occurs by actively adjusting power limitation using a charging/discharging power behavior of the battery while the vehicle is traveling.

In other words, according to the system for controlling vehicle power using big data, an available power value set by a controller according to a battery charging/discharging pattern may be optimally set and reflected when a vehicle is currently traveling. In addition, according to the system for controlling vehicle power using big data, it may be possible to provide optimal available battery power by reflecting a driving habit of a driver and regional variations therein because a parameter used for active battery power limitation varies through learning in a big data server according to a driving power pattern of a vehicle.

It will be appreciated by those skilled in the art that the effects achievable through the present disclosure are not limited to those that have been particularly described hereinabove and that other unmentioned effects of the present disclosure will be more clearly understood from the above detailed description.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
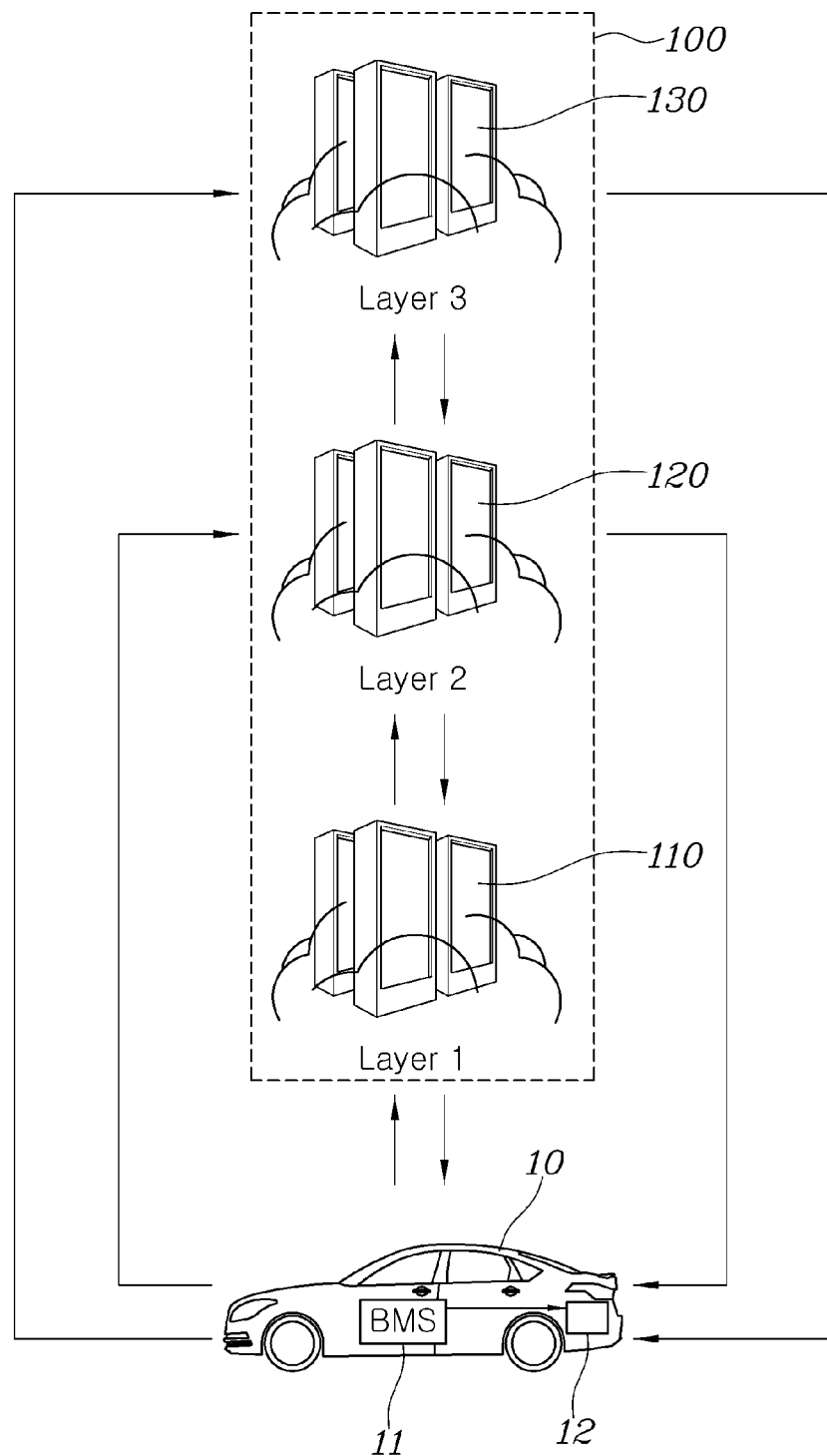
FIG. 1 is a configuration diagram illustrating a system for controlling vehicle power using big data according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a system for controlling vehicle power using big data according to various exemplary embodiments of the present disclosure will be described in detail with reference to the attached drawings.

FIG. 1 is a configuration diagram illustrating a system for controlling vehicle power using big data according to an exemplary embodiment of the present disclosure. Referring to FIG. 1, the system for controlling vehicle power using big data according to an exemplary embodiment of the present disclosure may include a big data server 100 configured to receive data related to driving of a vehicle 10 from the vehicle 10, process and analyze the received data to generate a driving power pattern of the vehicle 10 and store the driving power pattern, and a controller 11 provided in the vehicle 10 and configured to determine whether to limit charging/discharging power of a battery 12 based on a continuous charging/discharging time or an accumulation amount of continuous charging/discharging power of the battery 12 and calculate battery charging/discharging power to be limited based on the driving power pattern received from the big data server 100 when the charging/discharging power of the battery 12 is limited.

The big data server 100 may be configured to receive various types of data generated while the vehicle 10 is traveling from the vehicle 10, process and analyze the received data and store the processed and analyzed data. Particularly, the big data server 100 may be configured to generate a specific pattern related to driving of the vehicle based on input received from the vehicle or generated secondary data. As illustrated in FIG. 1, the big data server 100 may be implemented using distributed cloud computing in a multilayered structure having cloud servers 110, 120 and 130 provided to respective layers.

For example, the cloud server 110 belonging to the lowest layer of the multilayered structure may be configured to communicate with the vehicle 10 to log data generated in the vehicle 10 in real time and provide the logged data to the vehicle 10 or the cloud servers 120 and 130 belonging to higher layers of the lowest layer 110 as necessary. The cloud servers 120 and 130 belonging to the higher layers may be configured to process data provided from cloud servers of lower layers, store the processed data and transmit the processed data to the vehicle 10 by communicating with the vehicle 10. FIG. 1 illustrates an exemplary embodiment in which a total of three layers is provided, and the number of layers may be appropriately adjusted as necessary.

According to the exemplary embodiment illustrated in FIG. 1, the system for controlling vehicle power may include the first layer cloud server 110 configured to communicate with the vehicle 10 and log data of the vehicle 10 in real time, and the second layer cloud server 120 configured to process the data logged by the first layer cloud server 110 and provide the processed data to the vehicle 10.

The first layer cloud server 110 may be configured to log raw data generated in the vehicle 10 in real time via communication with the vehicle. The first layer cloud server 110 may be configured to log and store vehicle data without data loss at as short a sampling rate as possible. Further, the number of pieces of data that may be logged and stored per vehicle communicating with the first layer cloud server 110 may be limited for the first layer cloud server 110. Although all data logged from vehicles may be stored if resources permit, the first layer cloud server 110 may be configured to vehicles by communicating with the vehicles in real time, and thus it is desirable to limit the number of pieces of data that may be stored per vehicle for efficient use of resources.

Raw data logged by the first layer cloud server 110 is data generated in and transmitted from various controllers of a vehicle and may be, for example, a temperature, state of charge (SoC) and voltage of a battery, revolutions per minute (rpm), voltage and temperature of a motor, a vehicle speed, an external temperature, an engine rpm, and the like of the vehicle 10. Particularly, in various exemplary embodiments of the present disclosure for controlling battery power, real-time data provided from the vehicle 10 to the first layer cloud server 110 is data related to the battery 12 included in the vehicle and may be a charge/discharge state of the battery 12, a real-time current of the battery 12, a real-time time voltage of the battery 12, instantaneous power of the battery 12 calculated by the controller 11, a current travel distance, a vehicle speed, etc., for example. The vehicle 10 may be configured to request and receive stored data from the first layer cloud server 110 as necessary.

The second layer cloud server 120 may be configured to primarily process raw data logged by the first layer cloud server 110 to calculate items such as averages, maximum/minimum values, RMS, and standard deviations and store the calculated results. Processed data may be stored and managed in the form of a preset data set. Particularly, data stored in the second layer cloud server 120 may be stored in the form of processed data in a predetermined format instead of raw data and may be stored along with a date of corresponding data, a travel time or the like.

Although the first layer cloud server 110 immediately stores logged raw data, the second layer cloud server 120 that processes logged data need not necessarily process and store raw data in real time and a certain degree of delay time from reception of data to processing and storage of the data may be permitted. Particularly, in various exemplary embodiments of the present disclosure for controlling battery power, data processed and calculated in the second layer cloud server 120 may be a continuous discharging time and a continuous charging time of the battery 12, maximum/minimum/average power of the battery 12, average/maximum current of the battery 12, a vehicle speed, an average mileage, etc. The vehicle 10 may be configured to request and receive processed data from the second layer cloud server 120 as necessary.

The third layer cloud server 130 may be configured to secondarily process data processed in the second layer cloud server 120. The third layer cloud server 130 may be configured to perform data processing that requires calculation capability with higher performance than calculation required for data processing of the second layer cloud server 120. Additionally, the third layer cloud server 130 may be configured to generate and store data such as a driving pattern, a power pattern, an acceleration pattern, a degree of deterioration of a battery, cooling performance, and potential failure prediction using data processed in the second layer cloud server 120. Further, the third layer cloud server 130 may be configured to divide processed data values into similar groups based on a significant reference value. For example, the third layer cloud server 130 may be configured to divide driving patterns and power patterns of a vehicle into similar groups and store the similar groups.

The controller 11 included in the vehicle 10 may be configured to monitor power of the battery 12 and determine whether to limit battery charging/discharging power based on continuous charging/discharging time or an accumulation amount of continuous charging/discharging power of the battery 12. For example, the controller 11 may be configured to limit power of the battery 12 when a time for which the battery 12 is continuously charged/discharged to power equal to or greater than a predetermined rate of preset available power exceeds a reference time. Further, the controller 11 may be configured to limit power of the battery 12 when the accumulation amount of continuous charging/discharging power of the battery exceeds a preset reference value.

Additionally, the controller 11 may be configured to reset charging/discharging power of the battery 12 in a state in which power of the battery 12 is limited. More specifically, the controller 11 may be configured to receive information about a driving power pattern of the vehicle from the big data server 100 and set battery charging/discharging power to be limited based on the information upon determining that power of the battery 12 is limited.

The controller 11 may be configured to monitor and manage charging/discharging power of the battery 12 and may be a battery management system (BMS) configured to perform control related to the battery 12. The battery 12 may be a high-voltage battery that supplies power for driving a motor (not shown) that provides power to driving wheels of the vehicle. Specific operation of the system for controlling vehicle power using big data according to various exemplary embodiments of the present disclosure, configured as above, will be described.

Figure 2:
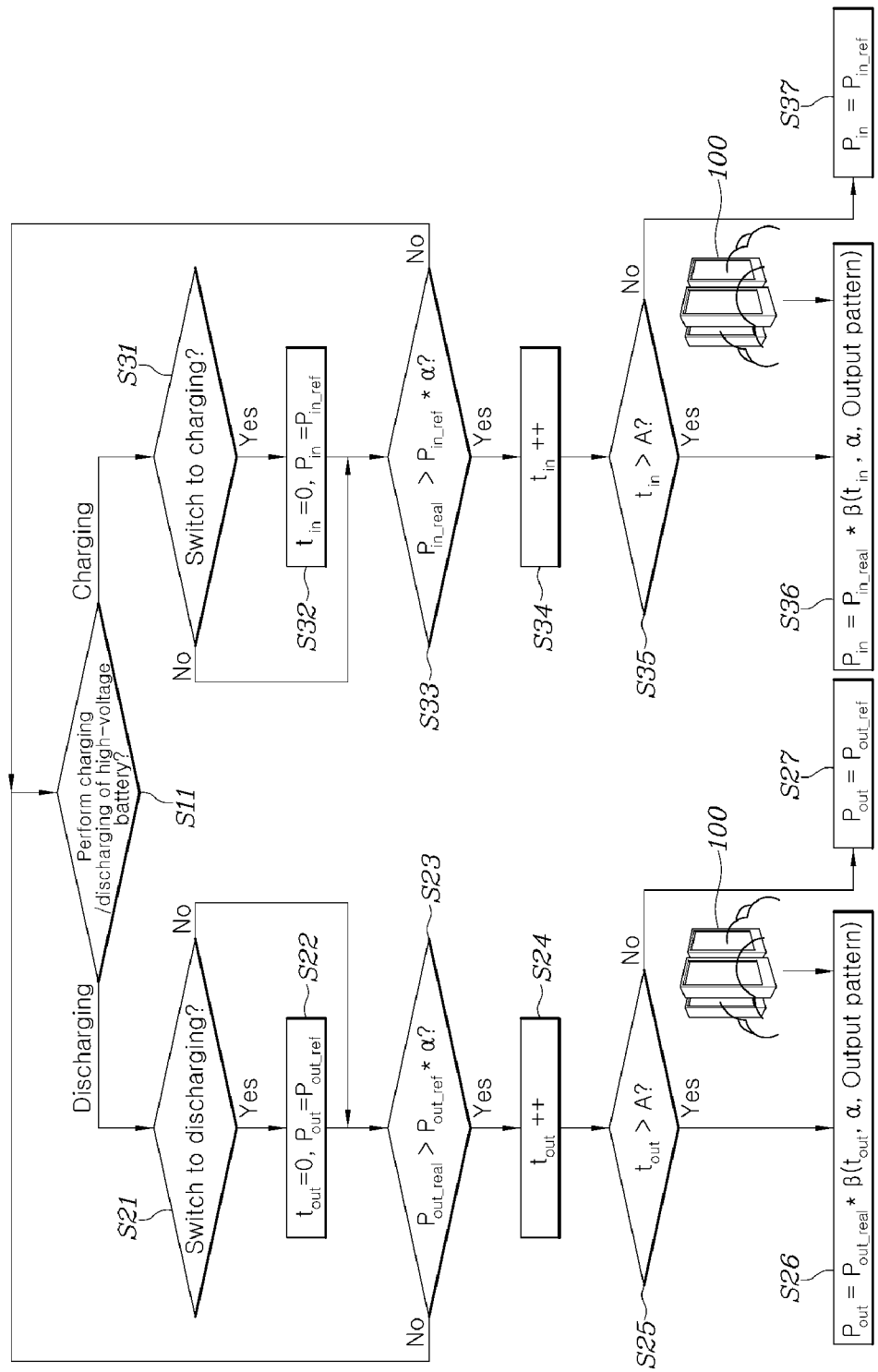
FIG. 2 is a flowchart illustrating an example of operation of limiting battery power on the basis of continuous charging/discharging time in the system for controlling vehicle power using big data according to an exemplary embodiment of the present disclosure.

FIG. 2 is a flowchart illustrating an example of an operation of limiting battery power based on continuous charging/discharging time in the system for controlling vehicle power using big data according to an exemplary embodiment of the present disclosure. The operation illustrated in FIG. 2 may be performed by the controller 11.

Referring to FIG. 2, when charging or discharging of the battery 12 is performed (S11), the controller 11 may be configured to determine whether a charge/discharge state of the battery 12 has switched (S21 and S31). For example, when the discharge state of the battery 12 in step S11 has switched from a previous charge state (S21), the controller 11 may be configured to initialize a monitoring variable for determining whether discharging continues (S22).

In step S22, the controller 11 may be configured to initialize a variable '$t_{out}$' for monitoring a discharging duration to 0 and initialize available discharging power $P_{out}$ of the battery 12 to '$P_{out\_ref}$' with reference to a prestored data map. Particularly, '$P_{out\_ref}$' corresponds to maximum available discharging power preset based on state of charge (SoC) of the battery 12 and a surrounding temperature and stored in a data map stored in the controller 11.

Similarly, in step S32, the controller 11 may be configured to initialize a variable '$t_{in}$' for monitoring a charging duration to 0 and initialize available charging power $P_{in}$ of the battery 12 to '$P_{in\_ref}$' with reference to a prestored data map. Particularly, '$P_{in\_ref}$' corresponds to maximum available charging power preset based on state of charge (SoC) of the battery 12 and a surrounding temperature and stored in a data map stored in the controller 11.

Subsequently, the controller 11 may be configured to determine whether actually used battery discharging power $P_{out\_real}$ and actually used battery charging power $P_{in\_real}$ are respectively greater than preset rates α (0<α<1) of the maximum available discharging power $P_{out\_ref}$ and the maximum available charging power $P_{in\_ref}$ (S23 and S33). In particular, the actually used battery discharging power $P_{out\_real}$ and the actually used battery charging power $P_{in\_real}$ may be calculated by the controller 11 measuring the voltage and current of the battery 12.

Subsequently, the controller 11 may be configured to check continuous charging/discharging times $t_{out}$ and $t_{in}$ of the battery 12 in response to determining that the actually used battery discharging power $P_{out}$ real and the actually used battery charging power $P_{in\_real}$ real are respectively greater than the preset rates α (0<α<1) of the maximum available discharging power $P_{out\_real}$ and the maximum available charging power $P_{in\_ref}$ (S24 and S34). Subsequently, in response to determining that the continuous charging/discharging times checked in steps S24 and S34 are longer than a preset reference time A (S25 and S35), the controller 11 may be configured to limit and set the available charging/discharging powers $P_{out}$ and $P_{in}$ based on a driving power pattern of the corresponding vehicle transmitted from the big data server 100 and then transmit the available charging/discharging powers $P_{out}$ and $P_{in}$ to various controllers of the vehicle such that charging/discharging powers of the battery may be determined within set values to be limited (S26 and S36).

Limitation of the charging/discharging powers performed in steps S26 and S36 may be determined based on a charging/discharging power limiting rate β determined based on actually measured charging/discharging powers $P_{out\_real}$ and $P_{in\_real}$ and the driving power pattern of the corresponding vehicle transmitted from the big data server 100.

In steps S26 and S36, the controller 11 may be configured to calculate the battery charging/discharging powers to be limited by multiplying the actually measured charging/discharging powers $P_{out\_real}$ and $P_{in\_real}$ by the charging/discharging power limiting rate β. In this manner, in an exemplary embodiment of the present disclosure, battery charging/discharging powers may be limited based on the actual charging/discharging powers $P_{out\_real}$ and $P_{in\_real}$ of the battery 12, and thus limitation of the battery charging/discharging powers may be rapidly performed immediately after calculating charging/discharging powers to be limited and limiting the battery charging/discharging powers are performed.

In particular, the charging/discharging power limiting rate β may have a value in the range of 0 to 1 and may be represented as a function of the continuous charging/discharging times $t_{out}$ and $t_{in}$, the actually measured battery charging/discharging powers $P_{out\_real}$ and $P_{in\_real}$, and a driving power pattern. For example, the charging/discharging power limiting rate β may decrease as the continuous charging/discharging times $t_{out}$ and $t_{in}$ of the battery increase since the battery may be protected when power is substantially limited as the continuous charging/discharging times $t_{out}$ and $t_{in}$ increase.

Further, the charging/discharging power limiting rate β may be determined to be a smaller value when a preset ratio α (0<α<1) of the actually measured battery charging/discharging powers $P_{out\_real}$ and $P_{in\_real}$ to the maximum available charging/discharging powers $P_{out\_ref}$ and $P_{in\_ref}$ is higher to substantially limit power to protect the battery. Additionally, a driving power pattern may be a type of learning value determined in the big data server 100.

For example, a driving power pattern refers to severity from the viewpoint of a battery, and patterns in which the battery is continuously charged/discharged with high power for a long time and patterns in which the battery is continuously charged/discharged for a short time may be grouped according to driving habits of a driver and reflected in the charging/discharging power limiting rate β. In addition, various driving habits of a driver which may affect the performance of the battery, such as a vehicle speed and the number of times of the battery arriving at a lower/upper limit voltage, variation in road situations such as an uphill road, a downhill road and a flat road, and the like may be reflected in grouping of driving power patterns.

When the continuous charging/discharging times checked in steps S25 and S35 are shorter than the preset reference time A, battery charging/discharging power limitation may be performed based on the maximum available charging/discharging powers acquired from the preset data map (S27 and S37).

Figure 3:
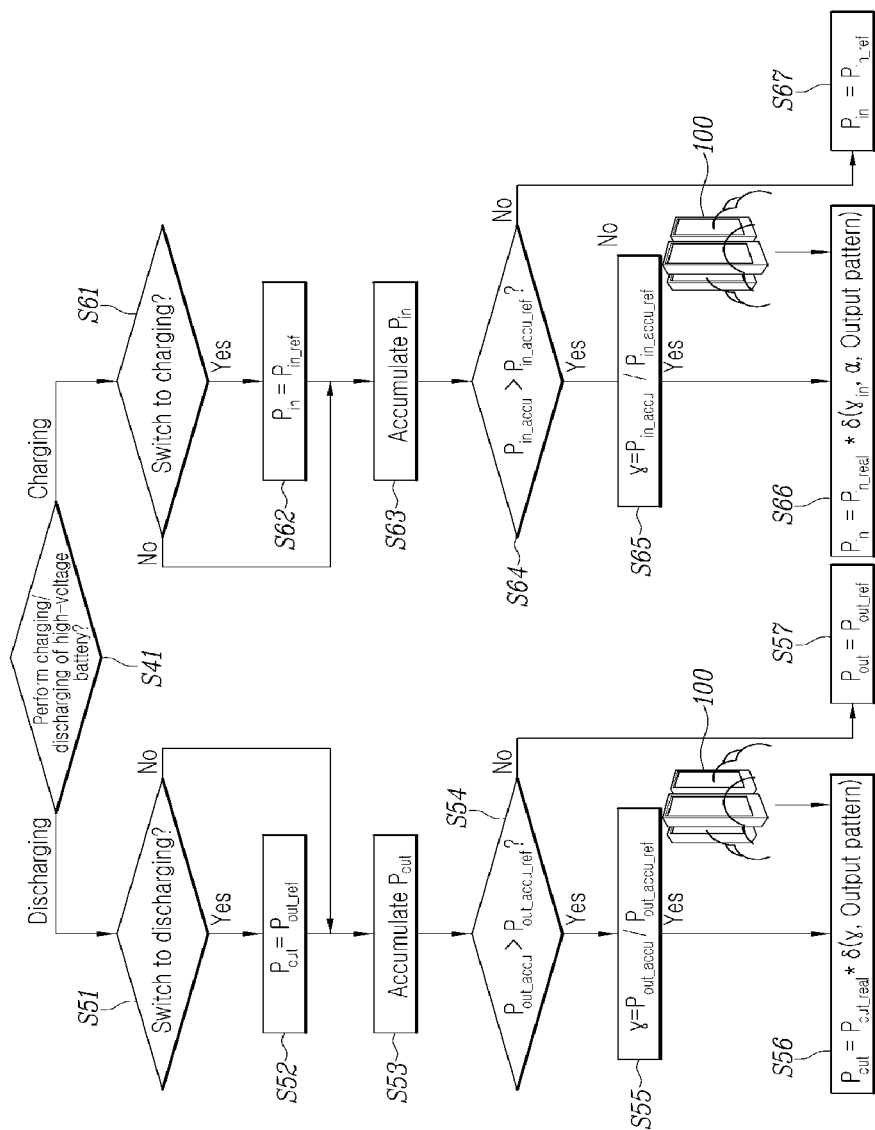
FIG. 3 is a flowchart illustrating an example of operation of limiting battery power on the basis of accumulation amounts of continuous charging/discharging powers in the system for controlling vehicle power using big data according to an exemplary embodiment of the present disclosure.

FIG. 3 is a flowchart illustrating an example of operation of limiting battery power based on accumulation amounts of continuous charging/discharging powers in the system for controlling vehicle power using big data according to an exemplary embodiment of the present disclosure. Step S41 illustrated in FIG. 3 is substantially the same as step S11 of FIG. 2, steps S51 and S52 of FIG. 3 are substantially the same as steps S21 and S22 of FIG. 2 and steps S61 and S62 of FIG. 3 are substantially the same as steps S31 and S32 of FIG. 2, and thus redundant description is omitted.

Referring to FIG. 3, the controller 11 may be configured to accumulate continuous charging/discharging powers of the battery 12 (S53 and S63) after steps S52 and S62. Subsequently, the controller 11 may be configured to compare accumulation amounts of battery continuous charging/discharging powers $P_{out\_accu}$ and $P_{in\_accu}$ with preset reference accumulation amounts $P_{out\_accu\_ref}$ and $P_{in\_accu\_ref}$ (S54 and S64). In response to determining that the accumulation amounts of battery continuous charging/discharging powers $P_{out\_accu}$ and $P_{in\_accu}$ are greater than the predetermined reference accumulation amounts $P_{out\_accu\_ref}$ and $P_{in\_accu\_ref}$, respectively, the controller 11 may be configured to divide the accumulation amounts of battery continuous charging/discharging powers $P_{out\_accu}$ and $P_{in\_accu}$ by the predetermined reference accumulation amounts $P_{out\_accu\_ref}$ and $P_{in\_accu\_ref}$ to calculate an accumulation amount excess rate γ (step S55 and S65).

Subsequently, the controller 11 may be configured to re-limit and set the available charging/discharging powers $P_{out}$ and $P_{in}$ of the battery 12 based on a driving power pattern of the corresponding vehicle transmitted from the big data server 100 and transmit the available charging/discharging powers $P_{out}$ and $P_{in}$ to various controllers of the vehicle such that charging/discharging powers of the battery may be determined within set values to be limited (S56 and S66).

Limitation of the charging/discharging powers performed in steps S56 and S66 may be determined based on a charging/discharging power limiting rate δ determined based on actually measured battery charging/discharging powers $P_{out\_real}$ and $P_{in\_real}$ and the driving power pattern of the corresponding vehicle transmitted from the big data server 100.

In the example illustrated in FIG. 3, the charging/discharging power limiting rate δ may be represented as a function of the accumulation amount excess rate γ calculated in steps S55 and S65 and a driving power pattern. In particular, the driving power pattern may be a learning value determined according to a driving power pattern in the big data server 100.

In steps S56 and S66, the controller 11 may be configured to calculate battery charging/discharging powers to be limited by multiplying the actually measured charging/discharging powers $P_{out\_real}$ and $P_{in\_real}$ by the charging/discharging power limiting rate δ. In this manner, in the operation example illustrated in FIG. 3, battery charging/discharging powers may also be limited based on the actual charging/discharging powers $P_{out\_real}$ and $P_{in\_real}$ of the battery 12, and thus limitation of the battery charging/discharging powers may be rapidly performed immediately after calculating charging/discharging powers to be limited and limiting the battery charging/discharging powers are performed according to an exemplary embodiment of the present disclosure.

When the continuous charging/discharging times checked in steps S55 and S65 are equal to or shorter than a preset reference time A, battery charging/discharging power limitation may be performed based on maximum available charging/discharging powers acquired from a preset data map (S57 and S67).

The charging/discharging power limiting rate δ described in FIG. 3 may be determined in a manner similar to the manner of determining the charging/discharging power limiting rate β applied in the exemplary embodiment of FIG. 2. However, since the limiting rate is determined based on accumulated charging/discharging powers in the exemplary embodiment of FIG. 3, the continuous charging/discharging times $t_{out}$ and $t_{in}$ may not be taken into account in determination of the charging/discharging power limiting rate δ.

When discharging power is limited in steps S26 and S57, the BMS 11 of the vehicle may be configured to provide a limited discharging power value $P_{out}$ to a vehicle controller included in the vehicle (e.g., a hybrid control unit (HCU) in the case of a hybrid vehicle), and the vehicle controller may be configured to operate high-voltage components in consideration of the limited discharging power value $P_{out}$. For example, the vehicle controller may be configured to decrease a torque command to be provided to an inverter that supplies 3-phase power to a driving motor of the vehicle, provide an off command to an air-conditioner controller of the vehicle, provide a command for reducing air-conditioner power or provide an off command to a converter of the vehicle such that discharging power does not exceed the limited discharging power value $P_{out}$. If the motor of the vehicle is unable output power requested by a driver due to the limited discharging power value $P_{out}$, the vehicle controller may be configured to increase the power of the engine of the hybrid vehicle to compensate for insufficient power from the motor such that the satisfactory vehicle performance is provided to the driver.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A system for controlling vehicle power, comprising:
   a server configured to receive vehicle driving related data generated in a vehicle, process and analyze the received data to generate a driving power pattern of the vehicle, and store the driving power pattern; and
   a controller provided in the vehicle and configured to receive the driving power pattern from the server, determine whether to limit a charging power or a discharging power of a battery based on a time for which the battery is continuously charged or discharged or an accumulation amount of power obtained when the battery is continuously charged or discharged, calculate the charging power or discharging power to be limited based on the driving power pattern received from the server, and limit charging or discharging of the battery based on the calculated charging power or discharging power,
   wherein the driving power pattern is a learning value determined according to the driving power pattern in the server.

2. The system according to claim 1, wherein the server includes a first layer cloud server configured to directly receive the vehicle driving related data from the vehicle, and a second layer cloud server configured to receive the vehicle driving related data from the first layer cloud server, process the vehicle driving related data to generate the driving power pattern and store the driving power pattern.

3. The system according to claim 1, wherein the controller is configured to calculate the time for which the battery is continuously charged or discharged in response to determining that a measured charging power or discharging power of the battery is greater than a preset maximum available charging power or discharging power.

4. The system according to claim 3, wherein the preset maximum available charging power or discharging power is stored in the controller in the form of a data map based on state of charge of the battery and a surrounding temperature.

5. The system according to claim 3, wherein, in response to determining that the time for which the battery is continuously charged or discharged is longer than a preset reference time, the controller is configured to calculate the charging power or discharging power to be limited based on the driving power pattern and the measured charging power or discharging power.

6. The system according to claim 5, wherein, in response to determining that the time for which the battery is continuously charged or discharged is longer than the preset reference time, the controller is configured to calculate the charging power or discharging power to be limited by calculating a charging power or discharging power limiting rate that is a function of the measured charging power or discharging power, the driving power pattern and the time for which the battery is charged or discharged and multiplying the measured charging power or discharging power by the charging power or discharging power limiting rate.

7. The system according to claim 6, wherein the controller is configured to compare the accumulation amount of power obtained when the battery is continuously charged or discharged with a preset reference accumulation amount, and in response to determining that the accumulation amount of power is greater than the reference accumulation amount, divide the accumulation amount of power by the preset reference accumulation amount to calculate an accumulation amount excess rate.

8. The system according to claim 7, wherein, in response to determining that the accumulation amount of power obtained when the battery is continuously charged or discharged is greater than the reference accumulation amount, the controller is configured to calculate the charging power or discharging power to be limited by calculating a charging power or discharging power limiting rate that is a function of the driving power pattern and the accumulation amount excess rate and multiplying the measured charging power or discharging power by the charging power or discharging power limiting rate.

\* \* \* \* \*